United States Patent

Bolser et al.

[11] Patent Number: 6,080,310
[45] Date of Patent: Jun. 27, 2000

[54] METHOD OF APPLYING A SLIP-RESISTANT COATING TO A SPIN-ON FILTER USING A FLUIDIZED BED COATING APPARATUS, AND SPIN-ON FILTER WHICH IS A PRODUCT THEREOF

[75] Inventors: Jerry Bolser, Oak Harbor, Ohio; Steven W. Quist, Sandy, Utah; Gregory Valcke, Stratford, Canada

[73] Assignee: AlliedSignal Inc., Morristown, N.J.

[21] Appl. No.: 09/271,136

[22] Filed: Mar. 17, 1999

[51] Int. Cl.[7] .............................. B01D 35/02; B05D 1/24; B05D 1/38; B05D 3/12
[52] U.S. Cl. ..................... 210/238; 210/440; 210/443; 210/DIG. 17; 427/185; 427/198; 427/271; 427/277; 427/278; 427/368; 427/385.5; 427/407.1
[58] Field of Search ................................ 427/459, 461, 427/185, 198, 264, 270, 271, 277, 278, 368, 385.5, 407.1; 210/DIG. 17, 238, 443, 440

[56] References Cited

U.S. PATENT DOCUMENTS

| | | | |
|---|---|---|---|
| 3,090,696 | 5/1963 | Gemmer | 427/185 |
| 4,416,776 | 11/1983 | Brundidge | 210/238 |
| 5,891,336 | 4/1999 | Vijlee et al. | 210/440 |
| 5,891,515 | 4/1999 | Dutheil et al. | 427/185 |

Primary Examiner—Shrive Beck
Assistant Examiner—Michael Barr

[57] ABSTRACT

A method of applying a curable powder coating, to a selected portion of a spin-on filter housing, uses a fluidized bed coating apparatus to provide a slip-resistant enhanced gripping surface when cured. This slip-resistant coating is applied to a selected portion of the exterior surface of the filter housing, in order to provide an easily grippable slip-resistant textured surface, once the powder has been cured. The textured coating according to the invention may be applied to a bare untreated plastic or metal surface, or alternatively, may be applied overlapping a cured layer of a conventional coating. A preferred coating is a thermosetting paint powder. In a first embodiment of the invention, a slip-resistant textured surface coating may be applied to the entire exterior surface of a spin-on filter housing, except the base plate thereof. In a second, preferred embodiment of the invention, it is desirable to limit the application of the above-described slip-resistant powder exclusively to a designated area, and to clean the area where the added powder is not wanted, in order to remove any extraneous powder from the remainder of the filter surface, and to present a visually appealing finished product. A spin-on filter having a slip-resistant textured gripping surface, which is a product of the described process, is also described.

19 Claims, 2 Drawing Sheets

METHOD OF APPLYING A SLIP-RESISTANT COATING TO A SPIN-ON FILTER USING A FLUIDIZED BED COATING APPARATUS, AND SPIN-ON FILTER WHICH IS A PRODUCT THEREOF

BACKGROUND OF THE INVENTION

1. Field of the Invention

The present invention relates to spin-on filter assemblies for filtering fluids, such as, for example, oil, fuel, or coolant.

More particularly, the present invention relates to a method of applying a grippable slip-resistant coating to a selected portion of a spin-on filter, using a fluidized bed coating apparatus, and to a spin-on filter which is a product of the described process.

2. Description of the Background Art

Spin-on fluid filters, generally, are well known and in wide use for filtering oil on internal combustion engines, for filtering gasoline at gasoline pumping stations, for filtering fuel oil or diesel fuel, as well as for other applications. These filter assemblies are generally cylindrical, often with a circular base plate, having an internally threaded central mounting hole formed therein, to allow spin-on installation thereof.

In many applications, particularly in crowded engine compartments on vehicles, an operator may have difficulty generating enough torque, by hand gripping, to install a spin-on filter to the manufacturer's torque specification. This may be due to other components blocking access to the filter mounting area, to oil spillage on to the filter housing exterior surface, or to other factors. Sometimes a tool, such as a filter wrench or the like, may be used to help gain added torque, but the tool may also be difficult to fit into the space provided. In addition, using a filter wrench to install a filter may even damage the filter housing, possibly leading to leakage of the filter, and is disfavored.

Some applications are known, generally, for applying slip-resistant surface treatments to enhance grippability of a surface. Slip-resistant enhanced gripping materials are known for use on stair steps, on selected areas of boat decks, and on some lawn furniture. However, it believed that heretofore, a method has not been available to place a slip-resistant coating on a grippable surface of a spin-on filter housing, using a fluidized bed coating apparatus, to provide a slip-resistant enhanced gripping surface.

A need still exists in the art for a method of manufacturing an improved spin-on filter having a slip-resistant coating thereon with a textured surface to make it easier to grab and tighten.

SUMMARY OF THE INVENTION

The present invention provides a method of applying a curable powder coating, to a selected portion of a spin-on filter housing, using a fluidized bed coating apparatus. This slip-resistant coating is applied to a selected portion of the exterior surface of the filter housing, in order to provide an easily grippable slip-resistant textured surface, once the powder has been cured. The textured coating according to the invention may be applied to a bare untreated plastic or metal surface, or alternatively, may be applied overlapping a cured layer of a conventional coating.

In a first embodiment of the invention, a slip-resistant textured surface coating may be applied to the entire exterior surface of a spin-on filter housing, except the base plate thereof.

In a second, preferred embodiment of the invention, it is desirable to limit the application of the above-described slip-resistant powder exclusively to a designated area, and to clean the area where the added powder is not wanted, in order to remove any extraneous powder from the remainder of the filter surface, and to present a visually appealing finished product.

A preferred coating material is a thermosetting paint powder.

The present invention is also directed to a spin-on filter having a slip-resistant textured gripping surface, which is a product of the described process.

Accordingly, it is an object of the present invention to provide a method of applying a slip-resistant coating to an exterior surface of a spin-on filter housing.

It is a further object of the present invention to provide a spin-on filter which is a product of the described process.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PREFERRED EMBODIMENT

Figure 1:
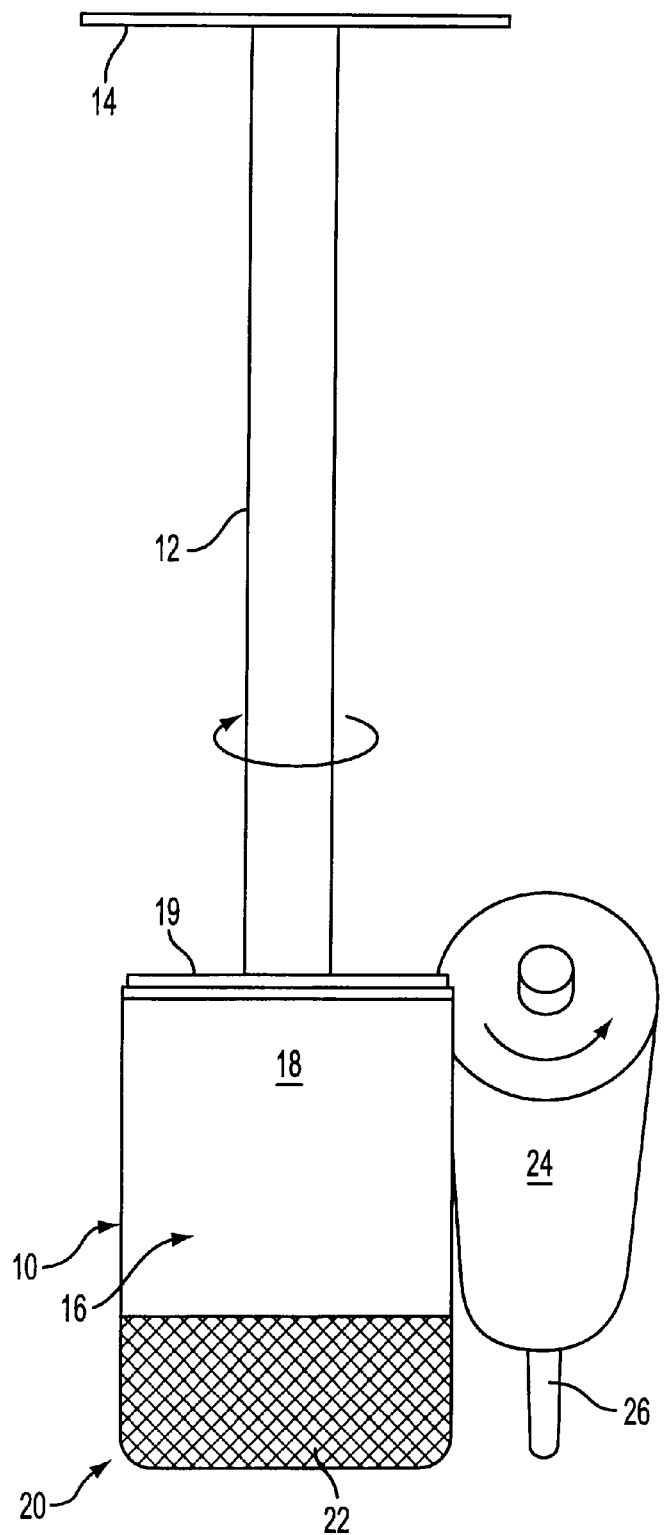
FIG. 1 is a side plan view of a segment of a chain-driven conveyor, showing a spindle carrying a spin-on filter assembly in accordance with the present invention.

Referring now to FIG. 1 of the drawings, a generally cylindrical spin-on filter is shown at 10, during one stage of a manufacturing process therefor. The filter 10 is temporarily mounted on a rotatable spindle 12, on a portion of a chain-on-edge conveyor 14. The filter 10 is constantly rotated on the spindle 12, in the direction indicated by the arrow next to the spindle 12, as it moves along on the conveyor 14.

In the illustration of FIG. 1, the conveyor 14 is moving the filter 10 in a direction away from the viewer.

The filter 10 includes a hollow housing 16 with an open-ended cylindrical shell 18 and a base plate 19 sealingly attached to the shell. The shell 18 includes a crown 20 at the end thereof opposite the base plate 19.

The base plate 19 is provided with a centrally located threaded bore (not shown) formed therein in conventional fashion, for allowing a spin-on attachment of the filter 10 adjacent a mounting surface (not shown) on an engine or the like, in the final use thereof. A porous cylindrical filter element (not shown) is contained within the housing 16, in conventional fashion.

Figure 2:
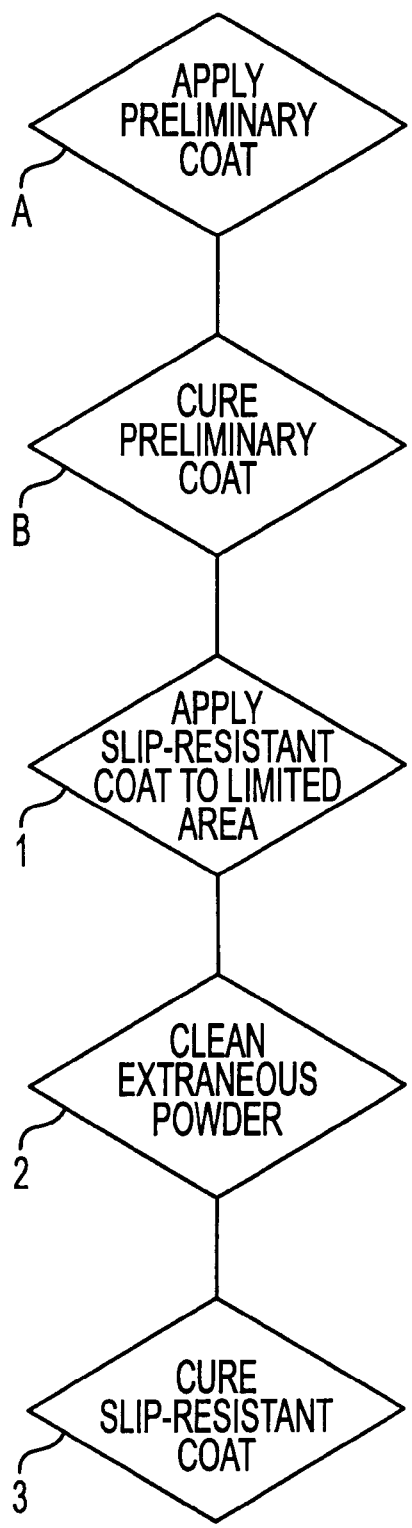
FIG. 2 is a flow chart showing steps in a preferred method according to the invention.

In the most preferred process of the present invention, a selected portion of the exterior surface of the shell 18, excluding the crown 20 thereof, is coated, preferably by a dry powder coating process, in a preliminary step, and the preliminary coating is then completely cured thereon. The application and curing of the preliminary coating is shown in the flow chart of FIG. 2 as steps A and B.

It is optionally acceptable, in the practice of the present invention, for the preliminary coating to entirely cover the shell 18, and for the slip-resistant coating to be applied thereover as a second coat. However, it is preferred to only have the first coating application area, where a preliminary coat is used, limited to the area of the shell 18 in the area thereof excluding the crown 20, in order to conserve on materials.

Electrostatic powder spray coating is one acceptable coating method for the preliminary coating, where used. Fluidized bed electrostatic powder coating could also be an acceptable coating method for the preliminary coating, but is not preferred.

In an exterior treatment according to the present invention, a first selected area of the filter housing 16, such as, for example, the crown 20 thereof, most remote from the base plate 19, is coated with an easily grippable slip-resistant coating 22, which is applied from a fluidized bed apparatus in the form of a curable powder. This coating 22 forms a slip-resistant textured surface when cured. The application of the slip-resistant coating is step 1 in the flowchart of FIG. 2.

A preferred type of slip-resistant coating is a thermosetting paint powder. One suitable thermosetting paint powder is a polyester powder is available from the Spraylat Corporation of Gainsville, Tex. and is sold under the trademark "CRACKED ICE".

Many fluidized bed coating processes are known. The fluidized bed coating apparatus for use in the method hereof may be an electrostatic coating apparatus such as that disclosed in U.S. Pat. Nos. 3,828,729 and 3,937,179, modified to the extent that the internal baffle, instead of being configured to expose different vertical portions of the object as it is conveyed thereby, as taught by the references, is configured to substantially limit application of the powder coating exclusively to an area of the filter 10 on which the coating is desired, such as, for example, the crown area 20 of the filter 10.

Optionally, in a non-preferred embodiment of the invention, the slip-resistant coating 22 may be applied to the entire exterior surface of the shell 16, leaving the base plate 19 uncoated.

By contrast, in the preferred method according to the present invention, the slip-resistant coating 22 is exclusively applied to a limited, clearly defined area of the filter 10, and is excluded from other areas thereof. In the application of the powder to the filter housing to form the slip-resistant gripping surface where a preliminary coating is already in place, it is preferred for the second powder coating to overlap the preliminary coat slightly, so that no untreated base material shows.

Whether or not the preliminary coating is applied to the housing 16, the method of the present invention necessarily includes a step of applying a curable powder material, from a fluidized bed of powder, to a first selected area of a filter housing, the powder material having a characteristic of providing a slip-resistant textured surface when cured.

Where both a preliminary coating and the slip-resistant coating 22 are used together on a filter, it is preferred that the slip-resistant coating be a different color from the preliminary coating.

The method hereof may further include a step of removing extraneous powder material from a second area of the filter body, where no grippable slip-resistant coating is desired, whereby a line is formed between the first and second areas. This step is shown as step 2 on the flowchart of FIG. 2. In the event that the entire exterior surface of the shell 18 is coated with a non-slip powder coating, no cleaning step is necessary.

Optionally, the method according to the invention may also include a step of lightly contacting the surface of the shell 18 with a cleaning belt (not shown) to help clean uncured powder off of the area where the powder is not wanted.

In the most preferred method according to the present invention, extraneous powder is removed by contacting the filter housing with a wiping member. The preferred wiping member is a spinning brush 24, which is rotatably mounted on a shaft 26, and which rotates in the direction shown by the arrow thereon in FIG. 1. Preferably, this brush 24 is between two and three inches in diameter, is between two and four feet in length, and is oriented with its longitudinal axis at about 5–10 degrees from the horizontal.

The method hereof also necessarily includes a step of curing the powder, whereby the first area of the filter housing provides a slip-resistant enhanced gripping surface after curing. The curing step is shown as step 3 in the flowchart of FIG. 2. The curing process, preferably, involves infrared curing, and most preferably, is a roughly 45 second cure cycle including 15 second of infrared curing, and 30 seconds of exposure to convection heating at a range of about 400–600 degrees Fahrenheit.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

What is claimed is:

1. A method of applying a grippable slip-resistant coating to a selected portion of the exterior surface of a spin-on filter, comprising the steps of:

applying a curable powder material from a fluidized bed apparatus to a first selected area of the exterior surface of a spin-on filter, said powder material having a characteristic of providing a slip-resistant textured surface when cured; and curing the powder to adhere it in place on the filter, whereby said first area of said filter provides a slip-resistant enhanced gripping surface.

2. The method of claim 1, futher comprising a step of removing extraneous powder material from a second area of the filter where no grippable slip-resistant coating is desired, whereby a line is formed between the first and second areas.

3. The method of claim 2, wherein the removing step comprises spinning the filter on a support member, and contacting the spinning filter with a wiping member.

4. The method of claim 3, wherein the wiping member comprises a rotating brush.

5. The method of claim 1, wherein the spin-on filter includes a circular base plate, and wherein said first area of said filter is exclusive of said base plate.

6. The method of claim 2, further comprising steps of applying a preliminary coating on to said second area of said filter, and curing said preliminary coating before said curable powder material is applied thereto.

7. The method of claim 6, wherein said curable powder material is applied overlapping a portion of said preliminary coating.

8. The method of claim 1, wherein said curable powder material comprises a thermosetting paint powder.

9. A method of applying a grippable slip-resistant coating to a selected portion of the exterior surface of a spin-on filter, comprising the steps of:

applying a preliminary coating to an exterior surface portion of a spin-on filter;

curing said preliminary coating;

applying a curable powder material from a fluidized bed apparatus to a selected gripping area of said exterior surface of the spin-on filter which is not the same area as the portion where the preliminary coating is applied, said powder material having a characteristic of providing a slip-resistant textured surface when cured; and curing the powder to adhere it in place on the filter, whereby said gripping area of said filter provides a slip-resistant enhanced gripping surface.

10. The method of claim 9, futher comprising a step of removing extraneous powder material from a second area of the filter where no grippable slip-resistant coating is desired, whereby a line is formed between the gripping and second areas.

11. The method of claim 10, wherein the removing step comprises spinning the filter on a support member, and contacting the spinning filter with a wiping member.

12. The method of claim 11, wherein the wiping member comprises a rotating brush.

13. The method of claim 9, wherein the spin-on filter includes a circular base plate, and wherein said gripping area of said filter is exclusive of said base plate.

14. The method of claim 10, wherein said curable powder material is applied overlapping a portion of said preliminary coating.

15. The method of claim 9, wherein said curable powder material comprises a thermosetting paint powder.

16. The method of claim 9, wherein said preliminary coating is applied having a first color, and wherein said curable powder material is a second color which is different from said first color.

17. A spin-on oil filter having a slip-resistant textured gripping surface thereon, said filter being a product of the process of claim 1.

18. A spin-on oil filter having a slip-resistant textured gripping surface thereon, said filter being a product of the process of claim 9.

19. The filter of claim 17, wherein said filter comprises a housing having a base plate at a first end thereof and a crown at a second end thereof substantially opposite said base plate, and wherein enhanced gripping surface is located on said crown area of said filter housing.

* * * * *